A. WILSHIRE.
ADJUSTABLE SEAT FOR SULKIES.
APPLICATION FILED OCT. 4, 1909.
969,825.
Patented Sept. 13, 1910.
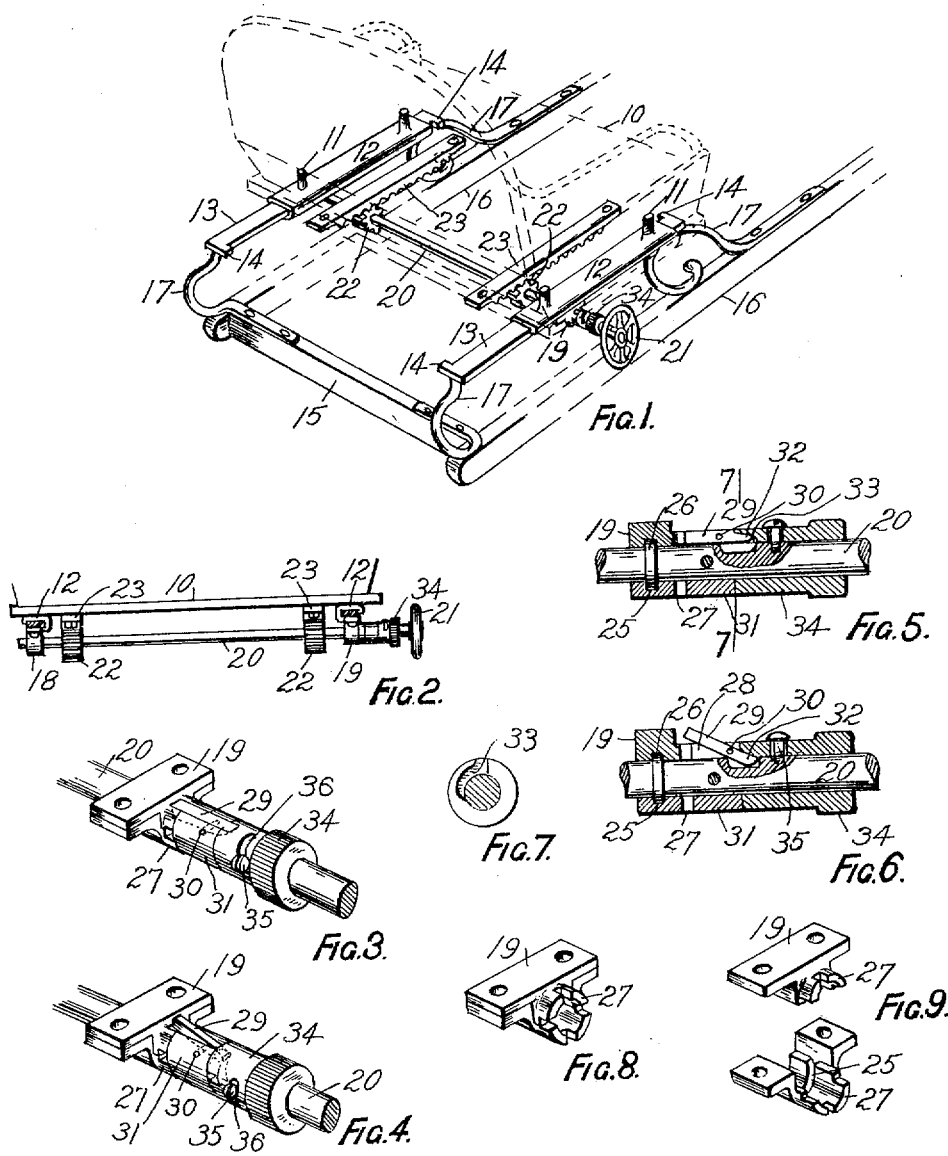

UNITED STATES PATENT OFFICE.

ARTHUR WILSHIRE, OF MANILLA, NEW SOUTH WALES, AUSTRALIA.

ADJUSTABLE SEAT FOR SULKIES.

969,825.  Specification of Letters Patent.  Patented Sept. 13, 1910.

Application filed October 4, 1909. Serial No. 521,007.

*To all whom it may concern:*

Be it known that I, ARTHUR WILSHIRE, a subject of the King of Great Britain and Ireland, and a resident of Manilla, in the State of New South Wales, in the Commonwealth of Australia, have invented certain new and useful Improvements in Adjustable Seats for Sulkies and Like Vehicles, of which the following is a specification.

My invention relates to that class of seats, for sulkies and like vehicles, which are adjustable lengthwise for the purpose of regulating the position of the load, and the object of my invention is to provide an easily manipulated mechanism whereby such adjustment can be made from the side of the seat.

The improved mechanism for the above purpose comprises essentially a rotatable transverse shaft mounted in a pair of bearings one of which is divided and has a notched extension and both attached to the underneath of the framing carrying the guides of the slidable seat. The said transverse shaft has keyed thereto a pair of pinions each of which engages with a rack affixed to the underneath of the said seat. The shaft has on one end a fixed collar with a pivoted trigger adapted to take in the notched extension of the divided bearing and to be released therefrom by a movable cam sleeve on said shaft. The divided bearing has a groove to receive a fixed collar on the shaft to prevent lateral movement.

Referring to the accompanying drawings which illustrate the invention applied to a slidable sulky seat, Figure 1, is a perspective view of this invention showing the sulky seat in dotted lines. Fig. 2, is a cross sectional elevation. Fig. 3, and Fig. 4, are perspective views of the operating shaft in the locked and unlocked positions respectively. Figs. 5 and 6 are longitudinal sections of Figs. 3 and 4. Fig. 7, is a cross section on line 7—7 Fig. 5. Figs. 8 and 9 are perspective views of the divided bearing with notched extension.

The slidable sulky seat 10 is of ordinary construction and is attached by studs 11 to the guides 12 slidable on guide bars 13 having stop pieces 14. Each of the bars 13 is secured to the transverse beam 15 and to the shafts 16 by brackets 17.

Affixed to the guide bars 13 are bearings 18 and 19 in which is mounted a rotatable shaft 20 having a hand wheel 21. On the shaft 20 are pinions 22 meshing with the racks 23 secured to the underneath of the seat 10. The bearing 19 is divided and has a groove 25 for the fixed collar 26 on the shaft 20, and has a notched extension 27 in which takes one end of a trigger 29 pivoted on a pin 30 within a slot 28 provided in the collar 31 rigidly attached to the shaft 20. The other end 32 of said trigger 29 is chamfered and takes in a camway 33 in the sleeve 34 movably secured to the shaft by a screw 35 taking in slot 36 which limits its movement.

In order to rotate the shaft 20 by the hand wheel 21 the trigger 29 is released from the notched extension 27 of the bearing 19 (see Figs. 4 and 6) by rotating the sleeve so that the cam way will lift the trigger clear of the notches, and when the desired position of the seat is attained the sleeve 34 is again rotated so that the trigger 29 will engage with one of the notches in the extension 27 thereby locking the shaft 20 thus preventing the seat 10 from sliding backward or forward in the vehicle.

What I claim and desire to secure by Letters Patent is:—

1. Mechanism for adjusting slidable seats of sulkies or like vehicles comprising a transverse shaft rotatable in bearings beneath the seat framing and having a pair of pinions each engaging with a rack, said shaft being locked by a pivoted trigger taking in a notched extension of one of the said bearings as herein described and ascertained.

2. Mechanism for adjusting slidable seats of sulkies or like vehicles comprising a transverse shaft rotatable in bearings beneath the seat framing, and having a pair of pinions each engaging with a rack, a pivoted trigger engaging in a notched extension of one of said bearings locking the shaft against rotation, and a collar on the rotatable shaft contained in a recess in one of said bearings.

3. Mechanism for adjusting slidable seats of sulkies or like vehicles comprising stationary guide bars, guides slidably mounted thereon supporting the seat framing, bearings connected to the guides, an operating shaft mounted on said bearings, pinions fixed on said shaft, racks engaged with the pinions, a trigger pivoted to the shaft engaging at its free end with one of said bearings to prevent the rotation of the shaft.

In testimony whereof I affix my signature in presence of two witnesses.

ARTHUR WILSHIRE.

Witnesses:
 AB. ALLEN,
 WALTER SIGMOND.